United States Patent
Luo et al.

(10) Patent No.: US 12,353,219 B2
(45) Date of Patent: Jul. 8, 2025

(54) METHOD AND SYSTEM FOR PATH PLANNING OF UNMANNED VEHICLE IN THREE-DIMENSIONAL TERRAIN

(71) Applicants: CHONGQING UNIVERSITY, Chongqing (CN); SHANGHAI UNIVERSITY, Shanghai (CN)

(72) Inventors: Jun Luo, Chongqing (CN); Lele Ding, Chongqing (CN); Huayan Pu, Chongqing (CN); Jie Ma, Chongqing (CN); Xuyang Zheng, Chongqing (CN); Hongliang Liu, Chongqing (CN); Jing Huang, Chongqing (CN); Yongbing Chen, Chongqing (CN); Anming Shen, Chongqing (CN)

(73) Assignees: Chongqing University, Chongqing (CN); Shanghai University, Shanghai (CN)

( * ) Notice: Subject to any disclaimer, the term of this patent is extended or adjusted under 35 U.S.C. 154(b) by 285 days.

(21) Appl. No.: 18/096,587

(22) Filed: Jan. 13, 2023

(65) Prior Publication Data
US 2023/0341869 A1 Oct. 26, 2023

(30) Foreign Application Priority Data
Apr. 21, 2022 (CN) .......................... 202210422548.X

(51) Int. Cl.
G05D 1/00 (2024.01)
(52) U.S. Cl.
CPC .................. *G05D 1/0274* (2013.01)
(58) Field of Classification Search
CPC .. G05D 1/0274; G05D 1/0214; G05D 1/0223; G05D 1/0221; G05D 1/0276;
(Continued)

(56) References Cited

U.S. PATENT DOCUMENTS

| 2020/0369292 | A1* | 11/2020 | Sadhu | ..................... G01C 21/20 |
| 2021/0094182 | A1* | 4/2021 | Sadhu | ................... G05D 1/0217 |
| 2021/0404826 | A1* | 12/2021 | Yu | ......................... A63F 13/422 |

FOREIGN PATENT DOCUMENTS

CN 109542117 B * 8/2023 ............... G05D 1/10

OTHER PUBLICATIONS

Wang et al "Improved RRT Algorithm for Field Environment Tends to Smooth Path", 2021 (Year: 2021).*

(Continued)

*Primary Examiner* — Abby Y Lin
*Assistant Examiner* — Esvinder Singh
(74) *Attorney, Agent, or Firm* — Bochner PLLC; Andrew Bochner; Eric Kleinertz

(57) ABSTRACT

The present disclosure provides a method and system for path planning of an unmanned vehicle in a three-dimensional terrain and relates to the technical field of path planning. The method includes building a random tree with an initial point of a to-be-planned path as a node; generating a random node based on a goal bias strategy and a multi-sampling strategy; determining a node in the random tree and with a minimum two-dimensional distance from the random node as a nearest node; determining a direction from the nearest node to the random node as an extension direction; determining a point corresponding to a preset step length as a to-be-determined node in the extension direction with the nearest node as a starting point; and updating the random tree or determining a path cut-off random tree through elevation detection and path search cut-off detection, so as to determine the to-be-planned path.

4 Claims, 2 Drawing Sheets

(58) Field of Classification Search
CPC .......... G05D 1/0212; G05D 1/10; G05D 1/46; G01C 21/20; G08G 5/0034; G08G 5/0086; B25J 9/1656; B25J 9/1664
See application file for complete search history.

(56) References Cited

OTHER PUBLICATIONS

Hartmann "The importance of goal sampling in RRTs", 2020 (Year: 2020).*

* cited by examiner

METHOD AND SYSTEM FOR PATH PLANNING OF UNMANNED VEHICLE IN THREE-DIMENSIONAL TERRAIN

CROSS REFERENCE TO RELATED APPLICATION

This patent application claims the benefit and priority of Chinese Patent Application No. 202210422548.X, filed on Apr. 21, 2022, the disclosure of which is incorporated by reference herein in its entirety as part of the present application.

TECHNICAL FIELD

The present disclosure relates to the technical field of path planning, and in particular, to a method and system for path planning of an unmanned vehicle in a three-dimensional terrain.

BACKGROUND ART

In recent years, the rapid development of robot technology has brought great convenience to from all spheres of industry. Taking field enemy situation reconnaissance and rescue and disaster relief as examples, robots are widely used because of their advantages of strong mobility, capability to continuously operate by means of battery supply, assist or replace rescue investigators, reduce safety risks, etc. Planning a safe and collision-free path in a complex terrain is the premise of safety of a robot itself and even the entire operation.

Currently, there are emerging algorithms for path planning of mobile robots, such as a graph search algorithm, a bionic intelligence algorithm, and a visibility graph algorithm. In 1998, LaValle proposed a sampling-based rapidly-exploring random tree (RRT) algorithm, which has been widely used because of its probability completeness, simple algorithm structure, and strong search capability in a complex environment. However, currently, most of research on the RRT algorithm is based on two-dimensional obstacle space, which is inconsistent with application scenarios of most robots. For example, a military mobile robot needs to choose an asymptotically optimal route based on a terrain and an enemy situation during reconnaissance. Therefore, the path planning of the RRT algorithm in a three-dimensional terrain is an urgent problem to be solved.

SUMMARY

An objective of the present disclosure is to provide a method and system for path planning of an unmanned vehicle in a three-dimensional terrain, which can complete path planning in the three-dimensional terrain and improve rationality of the path planning.

In order to achieve the foregoing objective, the present disclosure provides the following solutions:

A method for path planning of an unmanned vehicle in a three-dimensional terrain includes:

acquiring a map of a path planning region, and an initial point and a target point of a to-be-planned path, where the map includes two-dimensional coordinates and an elevation value of each point in the path planning region;

building a random tree with the initial point as a node;

generating a random node based on a goal bias strategy and a multi-sampling strategy;

determining a node in the random tree and with a minimum two-dimensional distance from the random node as a nearest node;

determining a direction from the nearest node to the random node as an extension direction;

determining a point corresponding to a preset step length as a to-be-determined node in the extension direction with the nearest node as a starting point;

performing elevation detection on the to-be-determined node based on the elevation value of the to-be-determined node and the elevation value of the nearest node;

adding the to-be-determined node that passes the elevation detection to the random tree as a child node of the nearest node, and determining the child node of the nearest node as a nearest updated node;

performing path search cut-off detection on the nearest updated node;

returning to the step of generating a random node based on a goal bias strategy and a multi-sampling strategy when the nearest updated node does not pass the path search cut-off detection;

determining, when the nearest updated node passes the path search cut-off detection, the target point as a child node of the nearest updated node, and adding the child node of the nearest updated node to the random tree, to obtain a path cut-off random tree; and constructing the to-be-planned path based on the path cut-off random tree.

Optionally, the generating a random node based on a goal bias strategy and a multi-sampling strategy specifically includes:

randomly obtaining a goal bias probability based on uniform probability distribution and formula $$p = p_1 + p_2\left(1 - \frac{a}{b}\right),$$

where p is a goal bias probability; $p_1$ and $p_2$ are constants, a is a minimum distance between the random tree and the target point after random node expansion ends, and b is a two-dimensional straight-line distance between the initial point and the target point;

determining whether the goal bias probability is less than a goal bias probability threshold to obtain a first determining result; and determining the target point as a random node if the first determining result is yes; or determining one of any two points that is in the path planning region and is closest to the target point as the random node if the first determining result is no.

Optionally, the performing elevation detection on the to-be-determined node based on the elevation value of the to-be-determined node and the elevation value of the nearest node specifically includes:

determining whether the elevation value of the to-be-determined node is less than an elevation threshold to obtain a second determining result;

determining that the to-be-determined node does not pass the elevation detection if the second determining result is no; or determining whether an absolute value of a difference between the elevation values of the to-be-determined node and the nearest node is less than an elevation difference threshold, to obtain a third determining result if the second determining result is yes;

determining that the to-be-determined node does not pass the elevation detection if the third determining result is no; or inserting a plurality of virtual nodes at equal intervals between the to-be-determined node and the nearest node if the third determining result is yes;

determining whether an absolute value of a difference between the elevation values of any adjacent virtual nodes is greater than or equal to the elevation difference threshold to obtain a fourth determining result; and determining that the to-be-determined node does not pass the elevation detection if the fourth determining result is yes; or determining that the to-be-determined node passes the elevation detection if the fourth determining result is no.

Optionally, after the determining that the to-be-determined node does not pass the elevation detection, the method further includes:

deflecting the extension direction clockwise and anti-clockwise by a preset angle with the nearest node as a rotation center, to obtain a first alternative direction and a second alternative direction;

determining a point corresponding to a preset step length as a first alternative node in the first alternative direction with the nearest node as a starting point;

determining a point corresponding to a preset step length as a second alternative node in the second alternative direction with the nearest node as a starting point;

performing elevation detection on the first alternative node and the second alternative node;

determining whether the two alternative nodes pass the elevation detection to obtain a fifth determining result, where the alternative node is the first alternative node or the second alternative node;

determining, if the fifth determining result is yes, one of the two alternative nodes with a minimum absolute value of a difference between the elevation values of the alternative node and the nearest node as a to-be-determined node passing the elevation detection, and returning to the step of performing path search cut-off detection on the to-be-determined node passing the elevation detection; or determining whether neither of the two alternative nodes passes the elevation detection if the fifth determining result is no, to obtain a sixth determining result; and returning to the step of generating a random node based on a goal bias strategy and a multi-sampling strategy if the sixth determining result is yes; or determining, if the sixth determining result is no, the alternative node passing the elevation detection as a to-be-determined node passing the elevation detection, and returning to the step of performing path search cut-off detection on the to-be-determined node passing the elevation detection.

Optionally, the performing path search cut-off detection on the nearest updated node specifically includes:

determining whether a two-dimensional distance between the nearest updated node and the target point is less than a distance threshold to obtain a seventh determining result;

determining that the nearest updated node does not pass the path search cut-off detection if the seventh determining result is yes; or performing elevation detection on the target point based on the elevation value of the target point and the elevation value of the nearest updated node if the seventh determining result is yes; and determining that the nearest updated node passes the path search cut-off detection when the target point passes the elevation detection.

A system for path planning of an unmanned vehicle in a three-dimensional terrain includes:

a data acquisition module configured to acquire a map of a path planning region, and an initial point and a target point of a to-be-planned path, where the map includes two-dimensional coordinates and an elevation value of each point in the path planning region;

a random tree building module configured to build a random tree with the initial point as a node;

a random node generation module configured to generate a random node based on a goal bias strategy and a multi-sampling strategy;

a module for determining a nearest node configured to determine a node in the random tree and with a minimum two-dimensional distance from the random node as a nearest node;

an extension direction determining module configured to determine a direction from the nearest node to the random node as an extension direction;

a first module for determining a to-be-determined node configured to determine a point corresponding to a preset step length as a to-be-determined node in the extension direction with the nearest node as a starting point;

a first elevation detection module configured to perform elevation detection on the to-be-determined node based on the elevation value of the to-be-determined node and the elevation value of the nearest node;

a random tree update module configured to add the to-be-determined node that passes the elevation detection to the random tree as a child node of the nearest node, and determine the child node of the nearest node as a nearest updated node;

a path search cut-off detection module configured to perform path search cut-off detection on the nearest updated node;

a loop module configured to return to the step of generating a random node based on a goal bias strategy and a multi-sampling strategy when the nearest updated node does not pass the path search cut-off detection;

a module for determining a path cut-off random tree configured to determine, when the nearest updated node passes the path search cut-off detection, the target point as a child node of the nearest updated node, and add the child node of the nearest updated node to the random tree, to obtain a path cut-off random tree; and a module for constructing a to-be-planned path configured to construct the to-be-planned path based on the path cut-off random tree.

Optionally, the random node generation module specifically includes:

a goal bias probability acquisition unit configured to randomly obtain a goal bias probability based on uniform probability distribution and formula $$p = p_1 + p_2\left(1 - \frac{a}{b}\right),$$

where p is a goal bias probability; $p_1$ and $p_2$ are constants, a is a minimum distance between the random tree and the target point after random node expansion ends, and b is a two-dimensional straight-line distance between the initial point and the target point;

a first determining unit configured to determine whether the goal bias probability is less than a goal bias probability threshold, to obtain a first determining result, and invoke a first random node determining unit if the first determining result is yes, or invoke a second random node determining unit if the first determining result is no;

the first random node determining unit configured to determine the target point as a random node; and the second random node determining unit configured to determine one of any two points that is in the path planning region and is closest to the target point as the random node.

Optionally, the first elevation detection module specifically includes:

a second determining unit configured to determine whether the elevation value of the to-be-determined node is less than an elevation threshold to obtain a second determining result, and invoke an elevation detection failure determining unit if the second determining result is no, or invoke a third determining unit if the second determining result is yes;

the elevation detection failure determining unit configured to determine that the to-be-determined node does not pass the elevation detection;

the third determining unit configured to determine whether an absolute value of a difference between the elevation values of the to-be-determined node and the nearest node is less than an elevation difference threshold, to obtain a third determining result, and invoke the elevation detection failure determining unit if the third determining result is no, or invoke a virtual node insertion unit if the third determining result is yes;

the virtual node insertion unit configured to insert a plurality of virtual nodes at equal intervals between the to-be-determined node and the nearest node;

a fourth determining unit configured to determine whether an absolute value of a difference between the elevation values of any adjacent virtual nodes is greater than or equal to the elevation difference threshold to obtain a fourth determining result, and invoke the elevation detection failure determining unit if the fourth determining result is yes, or invoke an elevation detection success determining unit if the fourth determining result is no; and the elevation detection success determining unit configured to determine that the to-be-determined node passes the elevation detection.

Optionally, the system further includes:

a module for determining an alternative direction configured to deflect the extension direction clockwise and anticlockwise by a preset angle with the nearest node as a rotation center, to obtain a first alternative direction and a second alternative direction;

a module for determining a first alternative node configured to determine a point corresponding to a preset step length as a first alternative node in the first alternative direction with the nearest node as a starting point;

a module for determining a second alternative node configured to determine a point corresponding to a preset step length as a second alternative node in the second alternative direction with the nearest node as a starting point;

a second elevation detection module configured to perform elevation detection on the first alternative node and the second alternative node;

a fifth determining module configured to determine whether the two alternative nodes pass the elevation detection to obtain a fifth determining result, where the alternative node is the first alternative node or the second alternative node, and invoke a second module for determining a to-be-determined node if the fifth determining result is yes, or invoke a sixth determining module if the fifth determining result is no;

the second module for determining a to-be-determined node configured to determine one of the two alternative nodes with a minimum absolute value of a difference between the elevation values of the alternative node and the nearest node as a to-be-determined node passing the elevation detection, and invoke the path search cut-off detection module;

the sixth determining unit configured to determine whether neither of the two alternative nodes passes the elevation detection to obtain a sixth determining result, and invoke the random node generation module if the sixth determining result is yes, or invoke a third module for determining a to-be-determined node if the sixth determining result is no; and the third module for determining a to-be-determined node configured to determine the alternative node passing the elevation detection as a to-be-determined node passing the elevation detection, and invoke the path search cut-off detection module.

Optionally, the path search cut-off detection module specifically includes:

a seventh determining unit configured to determine whether a two-dimensional distance between the nearest updated node and the target point is less than a distance threshold to obtain a seventh determining result, and invoke a first unit for determining a path search cut-off detection result if the seventh determining result is no, or invoke a target point elevation detection unit if the seventh determining result is yes;

the first unit for determining a path search cut-off detection result configured to determine that the nearest updated node does not pass the path search cut-off detection;

the target point elevation detection unit configured to perform elevation detection on the target point based on the elevation value of the target point and the elevation value of the nearest updated node; and a second unit for determining a path search cut-off detection result configured to determine that the nearest updated node passes the path search cut-off detection when the target point passes the elevation detection.

According to the specific embodiments according to the present disclosure, the present disclosure discloses the following technical effects:

The present disclosure provides a method and system for path planning of an unmanned vehicle in a three-dimensional terrain. The method includes building a random tree with an initial point of a to-be-planned path as a node; generating a random node based on a goal bias strategy and a multi-sampling strategy; determining a node in the random tree and with a minimum two-dimensional distance from the random node as a nearest node; determining a direction from the nearest node to the random node as an extension direction; determining a point corresponding to a preset step length as a to-be-determined node in the extension direction with the nearest node as a starting point; updating the random tree or determining a path cut-off random tree through elevation detection and path search cut-off detection, so as to determine the to-be-planned path. The goal bias strategy, the multi-sampling strategy, the elevation detection and the path search cut-off detection optimize an RRT algorithm (a method for planning a path by using the random tree is the RRT algorithm), and can complete path planning in a three-dimensional terrain and improve rationality of the path planning.

BRIEF DESCRIPTION OF THE DRAWINGS

To describe technical solutions in the embodiments of the present disclosure or in the prior art more clearly, the accompanying drawings required in the embodiments are briefly described below. Obviously, the accompanying drawings described below show only some embodiments of the present disclosure. A person of ordinary skill in the art may further obtain other accompanying drawings based on these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for path planning of an unmanned vehicle in a three-dimensional terrain, which can complete path planning in the three-dimensional terrain and improve rationality of the path planning.

To make the above-mentioned objective, features, and advantages of the present disclosure clearer and more comprehensible, the present disclosure will be further described in detail below in conjunction with the accompanying drawings and specific embodiments.

Embodiment 1

Figure 1:
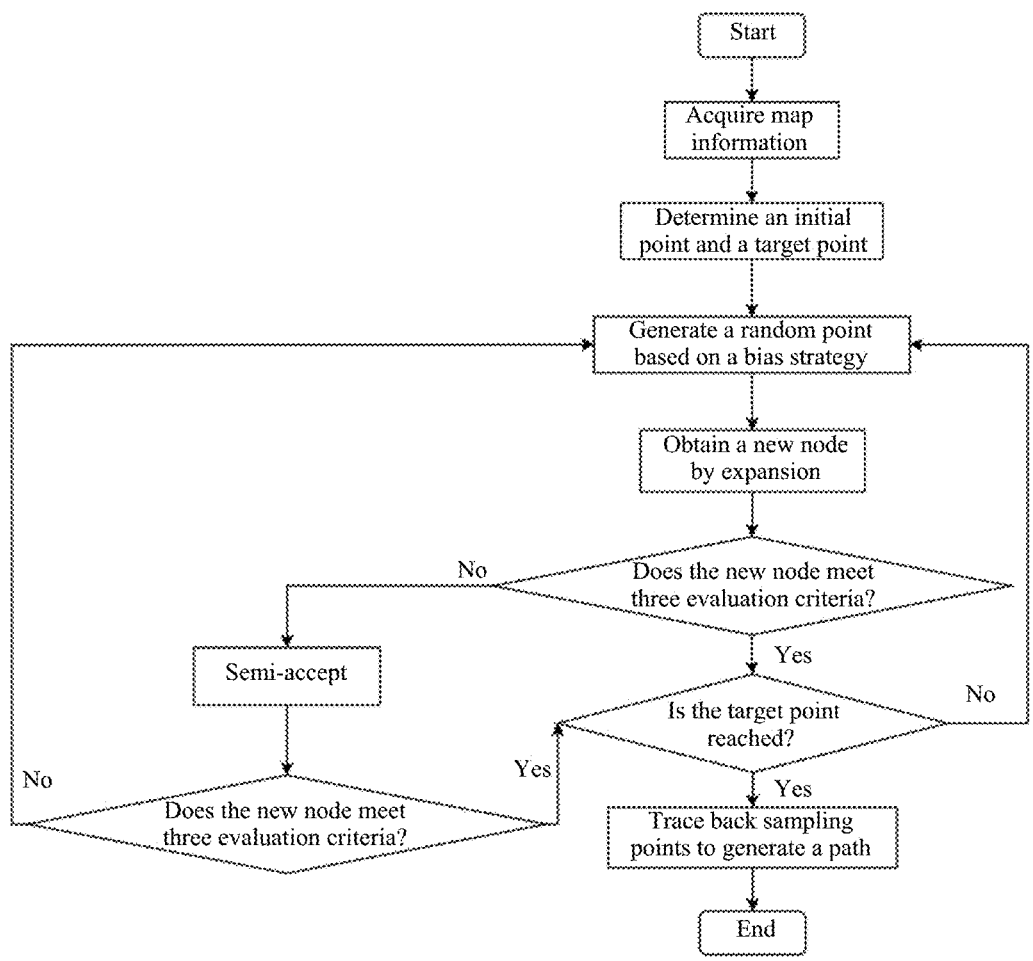
FIG. 1 is a flowchart of a method for path planning of an unmanned vehicle in a three-dimensional terrain in Embodiment 1 of the present disclosure.

As shown in FIG. 1, the present disclosure provides a method for path planning of an unmanned vehicle in a three-dimensional terrain, including:
acquiring a map of a path planning region, and an initial point and a target point of a to-be-planned path, where the map includes two-dimensional coordinates and an elevation value of each point in the path planning region;
building a random tree with the initial point as a node;
generating a random node based on a goal bias strategy and a multi-sampling strategy;
determining a node in the random tree and with a minimum two-dimensional distance from the random node as a nearest node;
determining a direction from the nearest node to the random node as an extension direction;
determining a point corresponding to a preset step length as a to-be-determined node in the extension direction with the nearest node as a starting point;
performing elevation detection on the to-be-determined node based on the elevation value of the to-be-determined node and the elevation value of the nearest node;
adding the to-be-determined node that passes the elevation detection to the random tree as a child node of the nearest node, and determining the child node of the nearest node as a nearest updated node;
performing path search cut-off detection on the nearest updated node;
returning to the step of generating a random node based on a goal bias strategy and a multi-sampling strategy when the nearest updated node does not pass the path search cut-off detection;
determining, when the nearest updated node passes the path search cut-off detection, the target point as a child node of the nearest updated node, and adding the child node of the nearest updated node to the random tree, to obtain a path cut-off random tree; and
constructing the to-be-planned path based on the path cut-off random tree.

The generating a random node based on a goal bias strategy and a multi-sampling strategy specifically includes:
randomly obtaining a goal bias probability based on uniform probability distribution and formula $$p = p_1 + p_2\left(1 - \frac{a}{b}\right),$$

where p is a goal bias probability; $p_1$ and $p_2$ are constants, a is a minimum distance between the random tree and the target point after random node expansion ends, and b is a two-dimensional straight-line distance between the initial point and the target point;
determining whether the goal bias probability is less than a goal bias probability threshold to obtain a first determining result; and
determining the target point as a random node if the first determining result is yes; or
determining one of any two points that is in the path planning region and is closest to the target point as the random node if the first determining result is no.

The performing elevation detection on the to-be-determined node based on the elevation value of the to-be-determined node and the elevation value of the nearest node specifically includes:
determining whether the elevation value of the to-be-determined node is less than an elevation threshold to obtain a second determining result;
determining that the to-be-determined node does not pass the elevation detection if the second determining result is no; or
determining whether an absolute value of a difference between the elevation values of the to-be-determined node and the nearest node is less than an elevation difference threshold, to obtain a third determining result if the second determining result is yes;
determining that the to-be-determined node does not pass the elevation detection if the third determining result is no; or inserting a plurality of virtual nodes at equal intervals between the to-be-determined node and the nearest node if the third determining result is yes;

determining whether an absolute value of a difference between the elevation values of any adjacent virtual nodes is greater than or equal to the elevation difference threshold to obtain a fourth determining result; and determining that the to-be-determined node does not pass the elevation detection if the fourth determining result is yes; or determining that the to-be-determined node passes the elevation detection if the fourth determining result is no.

After the determining that the to-be-determined node does not pass the elevation detection, the method further includes:

deflecting the extension direction clockwise and anti-clockwise by a preset angle with the nearest node as a rotation center, to obtain a first alternative direction and a second alternative direction;

determining a point corresponding to a preset step length as a first alternative node in the first alternative direction with the nearest node as a starting point;

determining a point corresponding to a preset step length as a second alternative node in the second alternative direction with the nearest node as a starting point;

performing elevation detection on the first alternative node and the second alternative node;

determining whether the two alternative nodes pass the elevation detection to obtain a fifth determining result, where the alternative node is the first alternative node or the second alternative node;

determining, if the fifth determining result is yes, one of the two alternative nodes with a minimum absolute value of a difference between the elevation values of the alternative node and the nearest node as a to-be-determined node passing the elevation detection, and returning to the step of performing path search cut-off detection on the to-be-determined node passing the elevation detection; or determining whether neither of the two alternative nodes passes the elevation detection if the fifth determining result is no, to obtain a sixth determining result; and returning to the step of generating a random node based on a goal bias strategy and a multi-sampling strategy if the sixth determining result is yes; or determining, if the sixth determining result is no, the alternative node passing the elevation detection as a to-be-determined node passing the elevation detection, and returning to the step of performing path search cut-off detection on the to-be-determined node passing the elevation detection.

The performing path search cut-off detection on the nearest updated node specifically includes:

determining whether a two-dimensional distance between the nearest updated node and the target point is less than a distance threshold to obtain a seventh determining result;

determining that the nearest updated node does not pass the path search cut-off detection if the seventh determining result is no; or performing elevation detection on the target point based on the elevation value of the target point and the elevation value of the nearest updated node if the seventh determining result is yes; and determining that the nearest updated node passes the path search cut-off detection when the target point passes the elevation detection.

Specifically, in the present disclosure, path planning of a mobile robot in a field mountain environment during operation is studied mainly, and the problems of long path planning time, relatively poor optimality of an obtained path, etc. caused by a large sampling range and high blindness of an original RRT algorithm during random point sampling in a three-dimensional terrain are solved mainly. In the present disclosure, through the improvement of the RRT algorithm, a certain strategy is used to generate sampling points, which accelerates approaching of newly generated nodes to a target point, and further reduces the planning time; the quality of the planned path is improved by establishing a mechanism for evaluation and expansion of new nodes; and the obtained path facilitates operation of unmanned vehicles.

The specific steps are as follows.

Figure 2:
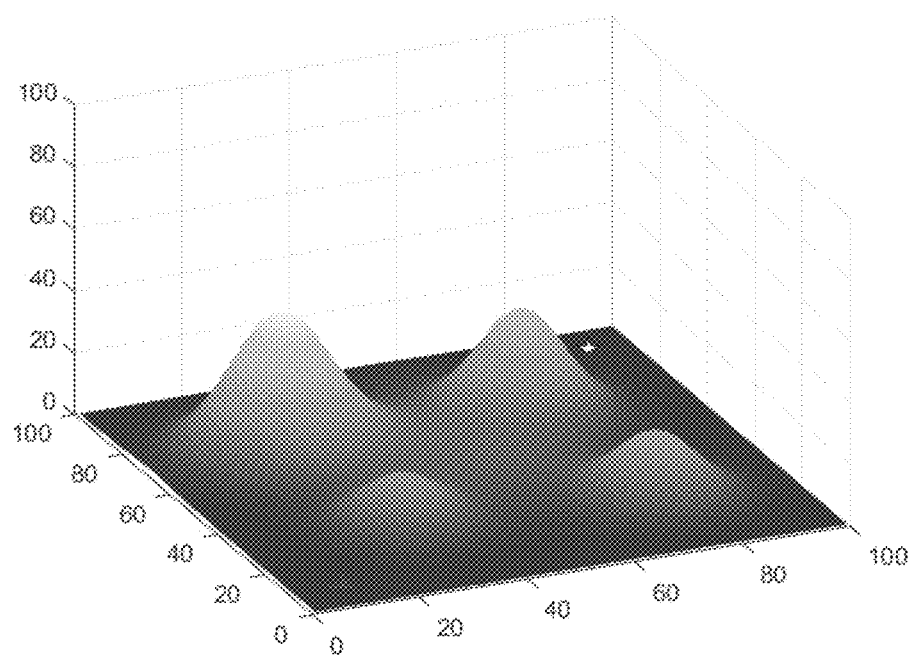
FIG. 2 is a three-dimensional map of a path planning region in Embodiment 1 of the present disclosure.

Step 1: Establish a three-dimensional map shown in FIG. 2 (in FIGS. 2 and 3, horizontal and vertical coordinates represent two-dimensional coordinates of a path planning region, and vertical coordinates represent elevation data), acquire map height data, acquire an initial point $X_{start}$ of a robot, provide a target point $X_{goal}$, initialize a random tree T, and add the initial point $X_{start}$ into the random tree T.

Step 2: Change a method for generating random points in an original RRT algorithm, and fuse two sampling rules, i.e., an RRT goal bias strategy and a multi-sampling strategy, to generate random points. The specific operation is as follows.

1. The goal bias strategy is improved, and a goal bias probability p is dynamically processed, that is, the value of p is determined based on a degree of algorithm execution. The specific operation is as follows:

$$p = p_1 + p_2\left(1 - \frac{a}{b}\right).$$

In order to ensure probability completeness and a convergence rate of the algorithm, usually, $p_1=0.1$, $p_2=0.2$, where a is a minimum distance between the random tree and the target point each time expansion of new nodes ends, and b is a straight-line distance between the initial point and the target point. That is, when the expansion reaches a certain degree, the possibility that the target point is used as $X_{rand}$ is increased and the convergence of the algorithm is accelerated.

2. Before the start of each sampling, a random value rand between 0 and 1 is obtained by using a random number function random( ), and the following processing is performed based on a size relationship between the random value and p.

$$X_{rand} = \begin{cases} X_{goal} & rand \leq p \\ X_{better} & rand > p \end{cases},$$

where $X_{better}$ is one of two random points ($X_{rand1}$ and $X_{rand2}$) acquired in three-dimensional space based on the multi-sampling strategy, which is closer to the target point, specifically as follows:

$$X_{better} = \begin{cases} X_{rand1} & |X_{rand1}X_{goal}| < |X_{rand2}X_{goal}| \\ X_{rand2} & |X_{rand1}X_{goal}| > |X_{rand2}X_{goal}| \end{cases}.$$

Step 3: Find a nearest node $X_{nearest}$ in the random tree T based on a position of $X_{rand}$ as a parent node $X_{parent}$ of $X_{rand}$, where $X_{rand}$ is a child node of $X_{parent}$; determine an expansion direction $|\overrightarrow{X_{parent}X_{rand}}|$ of a new node based on a position relationship between the parent node and the child node, and determine a new node $X_{new}$ by using a given step L.

Step 4: Based on established new evaluation criteria, detect the new node $X_{new}$ obtained through the expansion, and determine whether the new node meets requirements. The specific determining is as follows.

Criterion 1: By setting a height threshold $H_{max}$, determine whether a height value of $X_{new}$ meets $\Delta h \leq H_{max}$ after the new node $X_{new}$ is obtained.

Criterion 2: By setting a height difference threshold $h_{max}$, determine whether a height difference $\Delta h$ between the new node $X_{new}$ and the parent node thereof meets $\Delta h \leq h_{max}$.

Criterion 3: In order to prevent impassability between the parent node and the child node caused by an excessive expansion step, interpolate the current parent node and child node at equal intervals based on obstacle-crossing and trench-crossing capabilities of an unmanned vehicle to obtain several control points $X_1, X_2 \ldots X_n$ between two points, and detect these adjacent control points based on the height difference threshold $h_{max}$ set in criterion 2 to ensure that there will be no height mutation between the parent node and the child node.

Step 5: If the new node $X_{new}$ passes the detection in step 4, add information of this node and the corresponding parent node thereof into the random tree T; semi-accept the new node $X_{new}$ that does not pass the detection in step 4, that is, find two alternative points $X_1, X_2$ near this node, detect the two alternative points again, select a better one as a new node determined by using the current random point, and add the better one to the random tree. The specific operation is as follows.

Considering characteristics of a three-dimensional terrain, when the new node obtained through expansion based on the original RRT algorithm does not pass the detection in step 4, discarding is not performed immediately, but the original expansion direction is changed from $|\overrightarrow{X_{parent}X_{rand}}|$ to $|\overrightarrow{X_{parent}X_{rand}}| \pm \emptyset$, and $\emptyset$ is a preset angle, so as to obtain two alternative points. The two alternative points are detected again based on step 4, and the best one is selected as the alternative point of $X_{new}$ and added to the random tree. One of the two alternative point with a smaller height difference from the parent node is the optimal alternative point, and if the two found alternative points $X_1, X_2$ do not pass the detection in step 4, the alternative points are discarded, and step 2 is performed.

Step 6: Set an endpoint connection threshold $\lambda$, and determine, by calculation, whether a distance z from each new node $X_{new}$ passing the detection to the target point $X_{goal}$ meets the foregoing three criteria and $z \leq \lambda$. If the two are met, this new node $X_{new}$ is directly connected as the parent node of the target point $X_{goal}$, and information of the target point $X_{goal}$ and the corresponding parent node thereof is added to the random tree T. If one of the two is not met, step 2 is performed until the target point $X_{goal}$ is added to the random tree.

Figure 3:
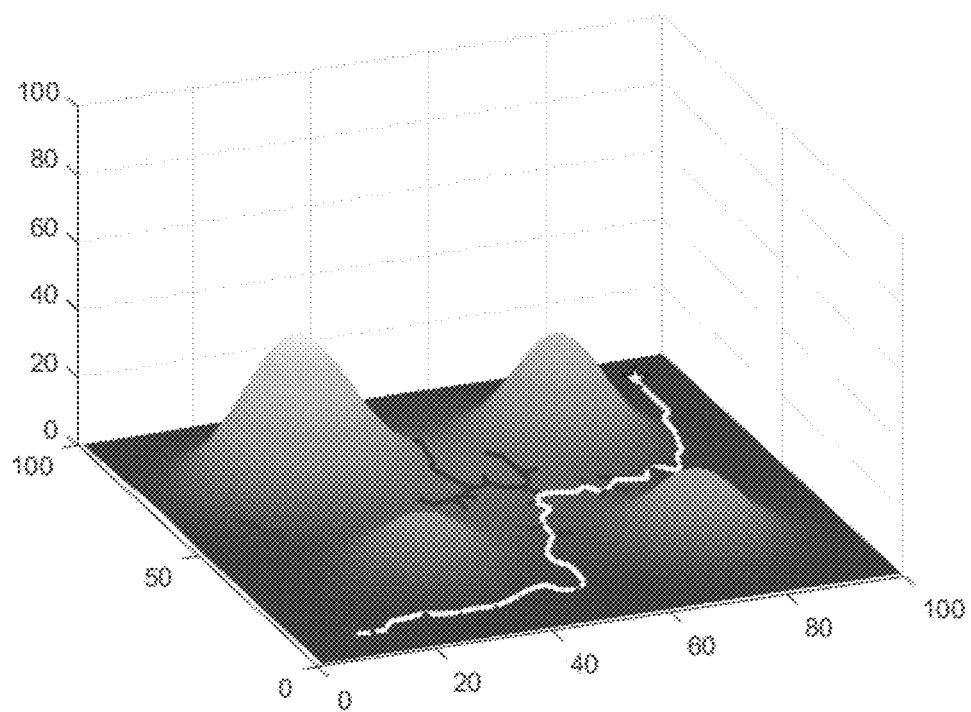
FIG. 3 is a schematic diagram of a to-be-planned path in Embodiment 1 of the present disclosure.

Step 7: Trace back the path from the target point $X_{goal}$ to the initial point $X_{start}$ in the random tree T; that is, from $X_{goal}$, find corresponding parent nodes of all nodes step by step sequentially until traceback is performed to $X_{start}$. Add these parent nodes to an array path ( ), and sequentially connect the nodes in path( ), and the obtained path is used as a preliminary path of this improved algorithm, as shown in FIG. 3.

In the present disclosure, random points are generated by fusing the two sampling rules, i.e., the goal bias strategy and the multi-sampling strategy, to accelerate the convergence rate of the algorithm; the goal bias strategy is improved, and the goal bias probability p is dynamically processed, that is, the value of p is determined based on the degree of algorithm execution; new evaluation criteria are established to detect the new nodes obtained by expansion, which indirectly optimizes the quality of the path; nodes that do not pass the detection are semi-accepted, and a success rate of sampling is indirectly improved by finding the optimal alternative point, which solves the problems of long path planning time, relatively poor optimality of an obtained path, etc. caused by a large sampling range and high blindness of an original RRT algorithm during random point sampling. By considering an impassable region on the map, height differences between parent nodes and child nodes, and the passability between the parent nodes and the child nodes, the three evaluation criteria are put forward for the acceptance of the new nodes obtained by expansion, so that the obtained path facilitates operation of unmanned vehicles.

In addition, the present disclosure further provides a system for path planning of an unmanned vehicle in a three-dimensional terrain, including:

a data acquisition module configured to acquire a map of a path planning region, and an initial point and a target point of a to-be-planned path, where the map includes two-dimensional coordinates and an elevation value of each point in the path planning region;

a random tree building module configured to build a random tree with the initial point as a node;

a random node generation module configured to generate a random node based on a goal bias strategy and a multi-sampling strategy;

a module for determining a nearest node configured to determine a node in the random tree and with a minimum two-dimensional distance from the random node as a nearest node;

an extension direction determining module configured to determine a direction from the nearest node to the random node as an extension direction;

a first module for determining a to-be-determined node configured to determine a point corresponding to a preset step length as a to-be-determined node in the extension direction with the nearest node as a starting point;

a first elevation detection module configured to perform elevation detection on the to-be-determined node based on the elevation value of the to-be-determined node and the elevation value of the nearest node;

a random tree update module configured to add the to-be-determined node that passes the elevation detection to the random tree as a child node of the nearest node, and determine the child node of the nearest node as a nearest updated node;

a path search cut-off detection module configured to perform path search cut-off detection on the nearest updated node;

a loop module configured to return to the step of generating a random node based on a goal bias strategy and a multi-sampling strategy when the nearest updated node does not pass the path search cut-off detection;

a module for determining a path cut-off random tree configured to determine, when the nearest updated node passes the path search cut-off detection, the target point as a child node of the nearest updated node, and add the child node of the nearest updated node to the random tree, to obtain a path cut-off random tree; and a module for constructing a to-be-planned path configured to construct the to-be-planned path based on the path cut-off random tree.

The random node generation module specifically includes:

a goal bias probability acquisition unit configured to randomly obtain a goal bias probability based on uniform probability distribution and formula $$p = p_1 + p_2\left(1 - \frac{a}{b}\right),$$

where p is a goal bias probability; $p_1$ and $p_2$ are constants, a is a minimum distance between the random tree and the target point after random node expansion ends, and b is a two-dimensional straight-line distance between the initial point and the target point;

a first determining unit configured to determine whether the goal bias probability is less than a goal bias probability threshold, to obtain a first determining result, and invoke a first random node determining unit if the first determining result is yes, or invoke a second random node determining unit if the first determining result is no;

the first random node determining unit configured to determine the target point as a random node; and the second random node determining unit configured to determine one of any two points that is in the path planning region and is closest to the target point as the random node.

The first elevation detection module specifically includes:

a second determining unit configured to determine whether the elevation value of the to-be-determined node is less than an elevation threshold to obtain a second determining result, and invoke an elevation detection failure determining unit if the second determining result is no, or invoke a third determining unit if the second determining result is yes;

the elevation detection failure determining unit configured to determine that the to-be-determined node does not pass the elevation detection;

the third determining unit configured to determine whether an absolute value of a difference between the elevation values of the to-be-determined node and the nearest node is less than an elevation difference threshold, to obtain a third determining result, and invoke the elevation detection failure determining unit if the third determining result is no, or invoke a virtual node insertion unit if the third determining result is yes;

the virtual node insertion unit configured to insert a plurality of virtual nodes at equal intervals between the to-be-determined node and the nearest node;

a fourth determining unit configured to determine whether an absolute value of a difference between the elevation values of any adjacent virtual nodes is greater than or equal to the elevation difference threshold to obtain a fourth determining result, and invoke the elevation detection failure determining unit if the fourth determining result is yes, or invoke an elevation detection success determining unit if the fourth determining result is no; and the elevation detection success determining unit configured to determine that the to-be-determined node passes the elevation detection.

The system for path planning of an unmanned vehicle in a three-dimensional terrain according to the present disclosure further includes:

a module for determining an alternative direction configured to deflect the extension direction clockwise and anticlockwise by a preset angle with the nearest node as a rotation center, to obtain a first alternative direction and a second alternative direction;

a module for determining a first alternative node configured to determine a point corresponding to a preset step length as a first alternative node in the first alternative direction with the nearest node as a starting point;

a module for determining a second alternative node configured to determine a point corresponding to a preset step length as a second alternative node in the second alternative direction with the nearest node as a starting point;

a second elevation detection module configured to perform elevation detection on the first alternative node and the second alternative node;

a fifth determining module configured to determine whether the two alternative nodes pass the elevation detection to obtain a fifth determining result, where the alternative node is the first alternative node or the second alternative node, and invoke a second module for determining a to-be-determined node if the fifth determining result is yes, or invoke a sixth determining module if the fifth determining result is no;

the second module for determining a to-be-determined node configured to determine one of the two alternative nodes with a minimum absolute value of a difference between the elevation values of the alternative node and the nearest node as a to-be-determined node passing the elevation detection, and invoke the path search cut-off detection module;

the sixth determining unit configured to determine whether neither of the two alternative nodes passes the elevation detection to obtain a sixth determining result, and invoke the random node generation module if the sixth determining result is yes, or invoke a third module for determining a to-be-determined node if the sixth determining result is no; and the third module for determining a to-be-determined node configured to determine the alternative node passing the elevation detection as a to-be-determined node passing the elevation detection, and invoke the path search cut-off detection module.

The path search cut-off detection module specifically includes:

a seventh determining unit configured to determine whether a two-dimensional distance between the nearest updated node and the target point is less than a distance threshold to obtain a seventh determining result, and invoke a first unit for determining a path search cut-off detection result if the seventh determining result is no, or invoke a target point elevation detection unit if the seventh determining result is yes;

the first unit for determining a path search cut-off detection result configured to determine that the nearest updated node does not pass the path search cut-off detection;

the target point elevation detection unit configured to perform elevation detection on the target point based on the elevation value of the target point and the elevation value of the nearest updated node; and a second unit for determining a path search cut-off detection result configured to determine that the nearest updated node passes the path search cut-off detection when the target point passes the elevation detection.

Each embodiment in this specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple. For the related part, reference may be made to the method description.

Specific examples are used herein to explain the principles and implementations of the present disclosure. The foregoing description of the embodiments is merely intended to help understand the method of the present disclosure and its core ideas. Besides, various modifications may be made by a person of ordinary skill in the art to specific implementations and the application scope in accordance with the ideas of the present disclosure. In conclusion, the content of this specification shall not be construed as a limitation to the present disclosure.

What is claimed is:

1. A method for path planning of an unmanned vehicle in a three-dimensional terrain, comprising:

acquiring a map of a path planning region, and an initial point and a target point of a to-be-planned path, wherein the map comprises two-dimensional coordinates and an elevation value of each point in the path planning region;

building a random tree with the initial point as a node;

generating a random node based on a goal bias strategy and a multi-sampling strategy, wherein the generating a random node based on a goal bias strategy and a multi-sampling strategy specifically comprises:

randomly obtaining a goal bias probability based on uniform probability distribution and formula $$p = p_1 + p_2\left(1 - \frac{a}{b}\right),$$

wherein p is a goal bias probability: $p_1$ and $p_2$ are constants, a is a minimum distance between the random tree and the target point after random node expansion ends, and b is a two-dimensional straight-line distance between the initial point and the target point;

determining whether the goal bias probability is less than a goal bias probability threshold to obtain a first determining result; and determining the target point as a random node if the first determining result is yes; or determining one of any two points that is in the path planning region and is closest to the target point as the random node if the first determining result is no;

determining a node in the random tree and with a minimum two-dimensional distance from the random node as a nearest node;

determining a direction from the nearest node to the random node as an extension direction;

determining a point corresponding to a preset step length as a to-be-determined node in the extension direction with the nearest node as a starting point;

performing elevation detection on the to-be-determined node based on the elevation value of the to-be-determined node and the elevation value of the nearest node;

adding the to-be-determined node that passes the elevation detection to the random tree as a child node of the nearest node, and determining the child node of the nearest node as a nearest updated node;

performing path search cut-off detection on the nearest updated node;

returning to the step of generating a random node based on a goal bias strategy and a multi-sampling strategy when the nearest updated node does not pass the path search cut-off detection;

determining, when the nearest updated node passes the path search cut-off detection, the target point as a child node of the nearest updated node, and adding the child node of the nearest updated node to the random tree, to obtain a path cut-off random tree;

constructing the to-be-planned path based on the path cut-off random tree; and controlling a robot to perform a task according to the to-be-planned path.

2. The method for path planning of an unmanned vehicle in a three-dimensional terrain according to claim 1, wherein the performing elevation detection on the to-be-determined node based on the elevation value of the to-be-determined node and the elevation value of the nearest node specifically comprises:

determining whether the elevation value of the to-be-determined node is less than an elevation threshold to obtain a second determining result, determining that the to-be-determined node does not pass the elevation detection if the second determining result is no; or determining whether an absolute value of a difference between the elevation values of the to-be-determined node and the nearest node is less than an elevation difference threshold, to obtain a third determining result if the second determining result is yes;

determining that the to-be-determined node does not pass the elevation detection if the third determining result is no; or inserting a plurality of virtual nodes at equal intervals between the to-be-determined node and the nearest node if the third determining result is yes;

determining whether an absolute value of a difference between the elevation values of any adjacent virtual nodes is greater than or equal to the elevation difference threshold to obtain a fourth determining result; and determining that the to-be-determined node does not pass the elevation detection if the fourth determining result is yes; or determining that the to-be-determined node passes the elevation detection if the fourth determining result is no.

3. The method for path planning of an unmanned vehicle in a three-dimensional terrain according to claim 2, wherein after the determining that the to-be-determined node does not pass the elevation detection, the method further comprises:

deflecting the extension direction clockwise and anti-clockwise by a preset angle with the nearest node as a rotation center, to obtain a first alternative direction and a second alternative direction;

determining a point corresponding to a preset step length as a first alternative node in the first alternative direction with the nearest node as a starting point;

determining a point corresponding to a preset step length as a second alternative node in the second alternative direction with the nearest node as a starting point;

performing elevation detection on the first alternative node and the second alternative node;

determining whether the two alternative nodes pass the elevation detection to obtain a fifth determining result, wherein the alternative node is the first alternative node or the second alternative node;

determining, if the fifth determining result is yes, one of the two alternative nodes with a minimum absolute value of a difference between the elevation values of the alternative node and the nearest node as a to-be-determined node passing the elevation detection, and returning to the step of performing path search cut-off detection on the to-be-determined node passing the elevation detection; or determining whether neither of the two alternative nodes passes the elevation detection if the fifth determining result is no, to obtain a sixth determining result; and returning to the step of generating a random node based on a goal bias strategy and a multi-sampling strategy if the sixth determining result is yes; or determining, if the sixth determining result is no, the alternative node passing the elevation detection as a to-be-determined node passing the elevation detection, and returning to the step of performing path search cut-off detection on the to-be-determined node passing the elevation detection.

4. The method for path planning of an unmanned vehicle in a three-dimensional terrain according to claim 1, wherein the performing path search cut-off detection on the nearest updated node specifically comprises:

determining whether a two-dimensional distance between the nearest updated node and the target point is less than a distance threshold to obtain a seventh determining result;

determining that the nearest updated node does not pass the path search cut-off detection if the seventh determining result is no; or performing elevation detection on the target point based on the elevation value of the target point and the elevation value of the nearest updated node if the seventh determining result is yes; and determining that the nearest updated node passes the path search cut-off detection when the target point passes the elevation detection.

\* \* \* \* \*